(12) United States Patent
Barnes et al.

(10) Patent No.: US 7,945,271 B1
(45) Date of Patent: May 17, 2011

(54) LOCATION INFERENCE USING RADIO FREQUENCY FINGERPRINTING

(75) Inventors: James D. Barnes, Overland Park, KS (US); Peter H. Distler, Overland Park, KS (US); Michael P. McMullen, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 853 days.

(21) Appl. No.: 11/779,900

(22) Filed: Jul. 19, 2007

(51) Int. Cl.
*H04W 24/00* (2009.01)

(52) U.S. Cl. ............... 455/456.1; 455/422.1; 455/115.3; 455/161.3; 455/226.2

(58) Field of Classification Search ..... 455/456.1–456.6
See application file for complete search history.

(56) References Cited

U.S. PATENT DOCUMENTS

| | | |
|---|---|---|
| 6,249,252 B1 | 6/2001 | Dupray |
| 6,405,044 B1 | 6/2002 | Smith et al. |
| 6,449,486 B1 | 9/2002 | Rao |
| 6,505,046 B1 | 1/2003 | Baker |
| 6,760,582 B2 | 7/2004 | Gaal |
| 6,801,778 B2 | 10/2004 | Koorapaty et al. |
| 6,961,367 B2 | 11/2005 | Simic et al. |
| 7,092,722 B1 | 8/2006 | Oh et al. |
| 7,343,317 B2 | 3/2008 | Jokinen et al. |
| 7,376,430 B2 | 5/2008 | Matsuda |
| 7,400,884 B2 | 7/2008 | Fok et al. |
| 2002/0086680 A1 | 7/2002 | Hunzinger |
| 2003/0008668 A1* | 1/2003 | Perez-Breva et al. .......... 455/456 |
| 2003/0065805 A1 | 4/2003 | Barnes, Jr. |
| 2004/0140361 A1 | 7/2004 | Paul et al. |
| 2004/0198386 A1 | 10/2004 | Dupray |
| 2004/0243519 A1 | 12/2004 | Perttila et al. |
| 2005/0192024 A1 | 9/2005 | Sheynblat |
| 2006/0089153 A1* | 4/2006 | Sheynblat .................. 455/456.1 |
| 2006/0178932 A1 | 8/2006 | Lang |
| 2007/0161380 A1 | 7/2007 | Fok et al. |
| 2008/0010114 A1 | 1/2008 | Head |
| 2008/0119206 A1 | 5/2008 | Shalmon et al. |
| 2008/0227467 A1 | 9/2008 | Barnes et al. |

FOREIGN PATENT DOCUMENTS

WO 2008112401 A1 9/2008

OTHER PUBLICATIONS

Final Office Action dated May 11, 2010, U.S. Appl. No. 11/686,179, filed Mar. 14, 2007, 23 pages.
Barnes, James D., et al., "Coupon Validation Using Radio Frequency Fingerprinting," U.S. Appl. No. 11/779,045, filed Jul. 17, 2007.
Izdepski, Erich J., et al., et al., "System and Method for Mobile Device Self-Location," U.S. Appl. No. 12/543,451, filed Aug. 18, 2009.

(Continued)

*Primary Examiner* — Kamran Afshar
*Assistant Examiner* — Vladimir Magloire

(57) ABSTRACT

A method for inferring location of a mobile device is provided. A radio frequency fingerprint is taken for a mobile device, wherein the radio frequency fingerprint includes cell tower data and cell sector data that includes a cell sector through which the mobile device is not communicating. Whether the radio frequency fingerprint matches a previous radio frequency fingerprint associated with a location fix is determined. A location fix technology is executed for the mobile device in response to a determination that the radio frequency fingerprint does not match the previous radio frequency fingerprint.

19 Claims, 5 Drawing Sheets

OTHER PUBLICATIONS

Oh, Dae-Sik, et al., et al., et al., "Mobile-Implemented Method and System for Performing a Handoff Based on Mobile Station Location," U.S. Appl. No. 10/784,612, filed Feb. 23, 2004.

Foreign Communication From a Related Counterpart Application—International Preliminary Report on Patentability, PCT/CN2008/054657, Sep. 24, 2008, 6 pages.

International Searching Authority, International Search Report and the Written Opinion of the International Searching Authority dated Jun. 5, 2008, International Application Serial No. PCT/US08/54657, international filing date Feb. 22, 2008.

Lightningcast, Inc., "Lightningcast Mobile Video Advertising Solution," May 2, 2005, 14 pgs.

Office Action dated Oct. 15, 2009, U.S. Appl. No. 11/686,179, filed Mar. 14, 2007, 19 pages.

Office Action dated Jan. 7, 2010, U.S. Appl. No. 11/779,045, filed Jul. 17, 2007, 23 pages.

Final Office Action dated Aug. 12, 2010, U.S. Appl. No. 11/868,179, filed Mar. 14, 2007, 23 pages.

Final Office Action dated Jul. 8, 2010, U.S. Appl. No. 11/779,045, filed Jul. 17, 2007, 30 pages.

Advisory Action dated Oct. 5, 2010, U.S. Appl. No. 11/779,045, filed Jul. 17, 2007.

Final Office Action dated Dec 7, 2010, U.S. Appl. No. 11/686,179 filed on Mar. 14, 2007.

\* cited by examiner

Fig. 4

| RADIO FREQUENCY FINGERPRINTS INDEX | LOCATION DATA | | |
|---|---|---|---|
| | RADIO FREQUENCY FINGERPRINT DATA | LOCATION FIX | LOCATION FIX TIME |
| CURRENT RADIO FREQUENCY FINGERPRINT | CELL TOWER #1844 SECTORS ALPHA AND BETA; CELL TOWER #1863 SECTOR BETA | | |
| PREVIOUS RADIO FREQUENCY FINGERPRINT | CELL TOWER #1844 SECTOR ALPHA; CELL TOWER #1863 SECTOR BETA | LATITUDE 42° 35' N LONGITUDE 83° 01' W | 3:01:59 PM 02-05-2006 |
| HISTORIC RADIO FREQUENCY FINGERPRINT | CELL TOWER #1844 SECTORS ALPHA AND BETA; CELL TOWER #1863 SECTOR BETA | LATITUDE 42° 25' N LONGITUDE 83° 01' W | 3:00:00 PM 02-05-2006 |

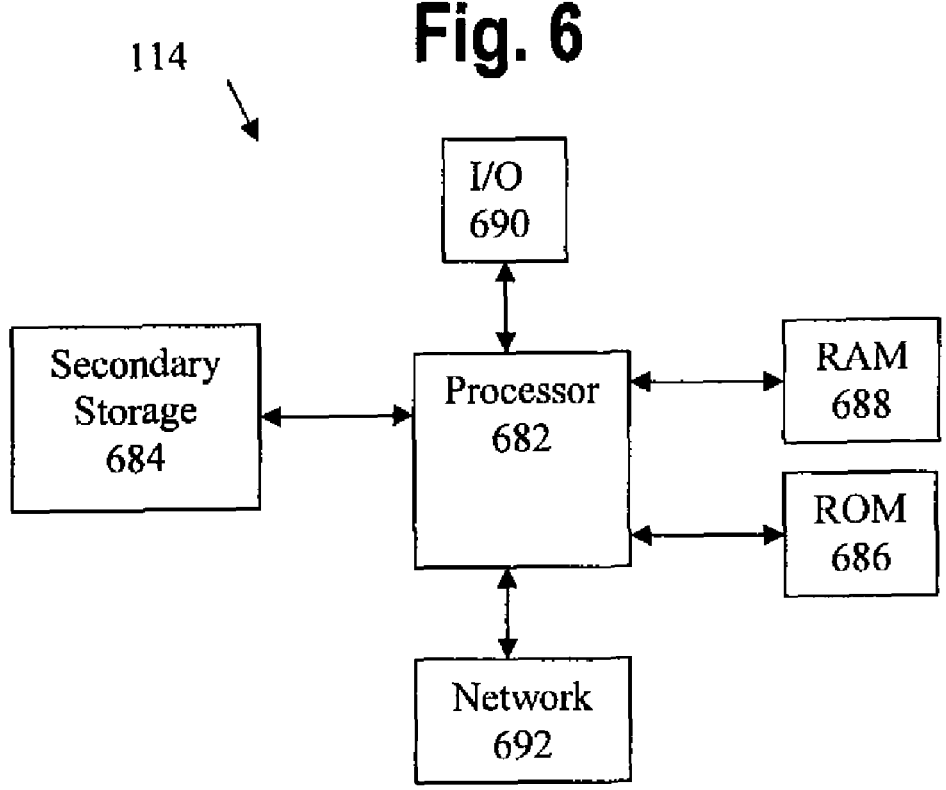

LOCATION INFERENCE USING RADIO FREQUENCY FINGERPRINTING

CROSS-REFERENCE TO RELATED APPLICATIONS

This application includes subject matter related to the following application, which is hereby incorporated by reference: U.S. patent application Ser. No. 11/686,179, filed Mar. 14, 2007, entitled "Architecture for Mobile Advertising with Location," by James D. Barnes, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices include applications, such as web browsers, that can request content from content providers, such as website servers. Such content providers may wish to provide customized content to a mobile device based on the location of the mobile device. For example, an advertisement provider may wish to design a football-related advertisement for mobile device users attending a football game played in a football stadium. But to provide customized content based on the geographic locations of mobile devices, content providers must overcome certain obstacles.

For example, if a mobile phone user activates a web browser to request news content from a news website server, the website server may have a limited amount of time to provide customized content. The website server may not have time to request the mobile phone to identify the location of the mobile phone, to receive the identified location of the mobile phone, to process the received location of the mobile phone, to select customized content for a specific intended audience based on the processed location, and to convey this customized content to the mobile device. This timing problem can be addressed by requiring the mobile device to determine its own location in advance.

Although determining the location of a mobile device in advance can be helpful for providing customized content, accurately determining the location can require a significant time and resources for the mobile device and the network for the mobile device. If the mobile device is not moving, such a consumption of significant time and resources for the mobile device and the network is often a waste of time and resources.

SUMMARY

In some embodiments, a method for inferring location of a mobile device is provided. A radio frequency fingerprint is taken for a mobile device. The radio frequency fingerprint includes cell tower data and cell sector data that includes a cell sector through which the mobile device is not communicating. Whether the radio frequency fingerprint matches a previous radio frequency fingerprint associated with a location fix is determined. A location fix technology is executed for the mobile device in response to a determination that the radio frequency fingerprint does not match the previous radio frequency fingerprint.

In other embodiments, a system for inferring location of a mobile device is provided. The system includes a mobile device and a location engine on the mobile device. The location engine takes a radio frequency fingerprint for the mobile device. The radio frequency fingerprint includes cell tower data and cell sector data that includes a cell sector through which the mobile device is not communicating. The location engine also determines whether the radio frequency fingerprint matches a previous radio frequency fingerprint associated with a location fix. Additionally, the location engine executes a location fix technology for the mobile device in response to a determination that the radio frequency fingerprint does not match the previous radio frequency fingerprint associated with the location fix.

In still other embodiments, a method for inferring location of a mobile device is provided. A radio frequency fingerprint is taken for a mobile device. The radio frequency fingerprint includes cell tower data and cell sector data that includes a cell sector through which the mobile device is not communicating. Whether the radio frequency fingerprint matches another radio frequency fingerprint associated with a location fix for another mobile device is determined. A location fix technology is executed for the mobile device in response to a determination that the radio frequency fingerprint does not match the other radio frequency fingerprint.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, in which like reference numerals represent like parts.

FIG. 4 shows location information for location inference using radio frequency fingerprinting according to some embodiments of the present disclosure.

FIG. 6 shows an illustrative general purpose computer system suitable for implementing portions of the several embodiments of the present disclosure.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

In embodiments of the present disclosure, methods and systems for inferring the location of a mobile device are provided to enable content providers to provide geography specific customized content. Instead of executing a location fix technology that unnecessarily drains the battery of a mobile device and consumes significant network time and resources, the mobile device takes a radio frequency fingerprint that includes cell tower data and cell sector data that includes a cell sector through which the mobile device is not communicating. Then the mobile device determines whether the radio frequency fingerprint matches a previous radio frequency fingerprint that is associated with a location fix. If the current radio frequency fingerprint matches the previous radio frequency fingerprint, then the mobile device has not moved since the previous radio frequency fingerprint. Therefore, the mobile device can infer its current location as the same location fix that is associated with the previous radio frequency fingerprint. The mobile device only needs to execute a location fix technology if the current radio frequency fingerprint does not match the previous radio frequency fingerprint. In some embodiments, the mobile device can store a history of previous radio frequency fingerprints for matching purposes.

In other embodiments, the mobile device compares its current radio frequency fingerprint with the current radio frequency fingerprint and associated location fix of a second mobile device to determine a match. If the current radio frequency fingerprint matches the current radio frequency fingerprint of the second mobile device, then the mobile device can infer its current location as the same location fix associated with the current radio frequency fingerprint of the second mobile device. The mobile device only needs to execute a location fix technology if the current radio frequency fingerprint does not match the current radio frequency fingerprint associated with the location fix of the second mobile device.

Figure 1:
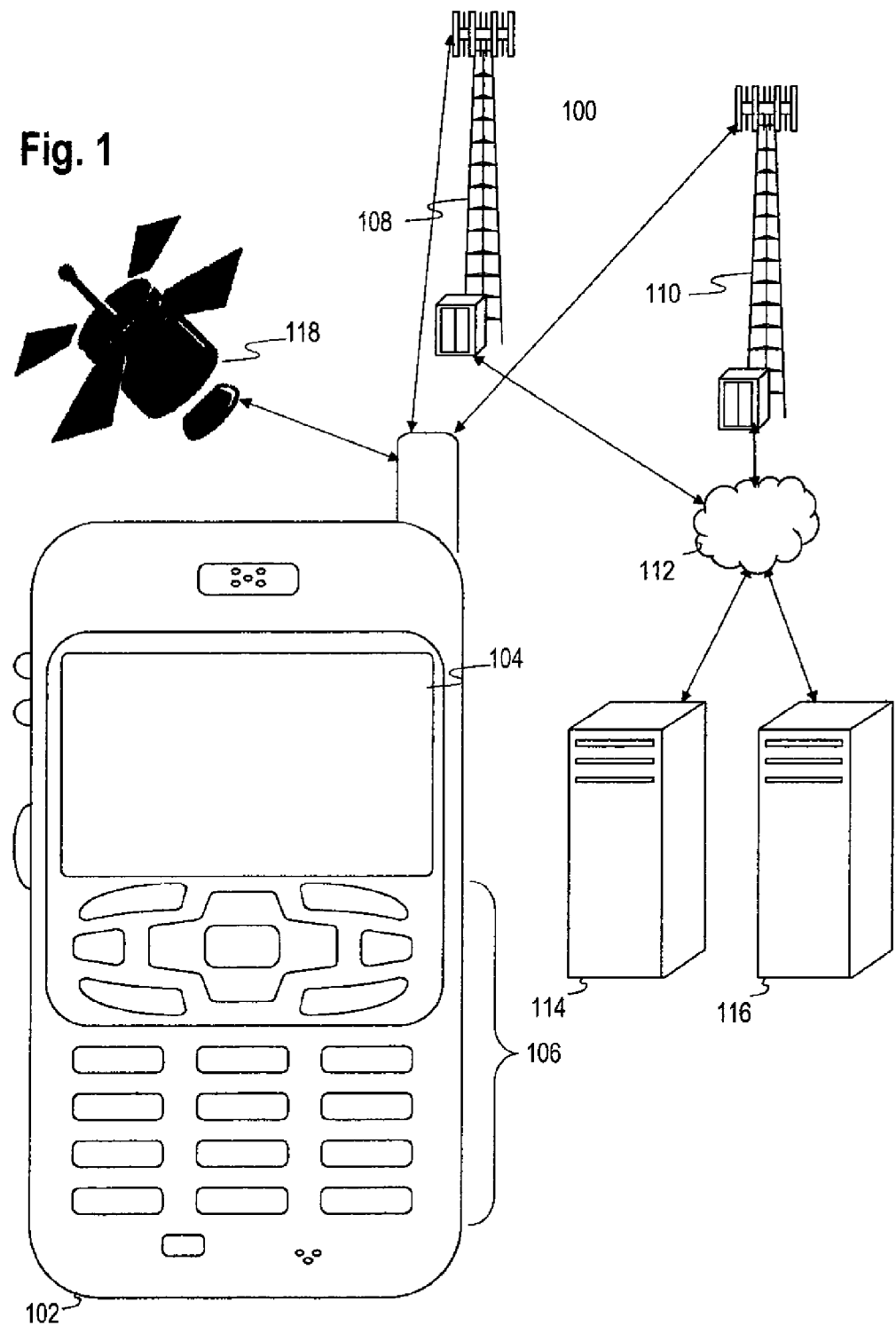
FIG. 1 shows an illustrative wireless communications system for location inference using radio frequency fingerprinting.

FIG. 1 shows a wireless communications system 100 that illustrates the context for the systems and methods of the present disclosure. The wireless communication system includes an illustrative mobile device 102. Though illustrated as a mobile phone, the mobile device 102 may take various forms including a personal digital assistant (PDA), a mobile computer, a digital camera, and a digital music player. Many suitable mobile devices combine some or all of these functions.

The mobile device 102 includes a display 104 and a touch-sensitive surface or keys 106 with which to interact with a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, including web browsing and location determination.

In the illustrative system 100, the mobile device 102 communicates through either a first cell tower 108 or a second cell tower 110 and through a wired or wireless network 112 to access information on various servers, such as a content server 114 and a location inference server 116. While two cell towers are shown in FIG. 1, other cell towers could be present. The content server 114 may provide content that may be shown on the display 104. The location inference server 116 can store a radio frequency fingerprint, a location fix, and a corresponding time of execution for a location fix technology. While one content server and one location inference server are shown in FIG. 1, other servers could be present. The content server 114 and the location inference server 116 communicate with the mobile device 102 through the network 112 and either the first cell tower 108 or the second cell tower 110 by a standard wireless telephony protocol (such as code division multiple access), a wireless internet connection, or some other means of wireless communication. Although the content server 114 and the location inference server 116 are depicted separately in FIG. 1, the functions of the content server 114 and the functions of the location inference server 116 can be combined on one server.

The mobile device 102 may communicate with a global positioning satellite 118. Global positioning system satellites transmit signals that are received by the mobile device 102. The mobile device 102 triangulates its position based on the different signals received from different satellites. The location accuracy is environment driven and dependant on the type of equipment used. The global positioning system technology is owned and operated by the U.S. Department of Defense, but is available for general use around the world. The global positioning system technology requires a direct line of sight between the mobile device 102 and four or more satellites to fix the location of the mobile device, such as when the mobile device is outdoors. Although the global positioning system technology provides high accuracy location fixes, this technology often cannot provide location fixes for mobile devices that are indoors. Because of the time and the battery power required to measure signals from multiple satellites and to triangulate the location fix, the mobile device 102 executes the global positioning system technology in the background infrequently for periodic determinations of location fixes.

Furthermore, the mobile device 102 can use advanced forward link trilateration technology to determine its position based on the different radio frequency signals received from different cell towers, such as the first cell tower 108 and the second cell tower 110. Each serving cell tower broadcasts a system parameters information message to the mobile device 102. This message includes the longitude and the latitude of the serving cell tower. The radius covered by serving cell towers vary greatly, from hundreds of meters in dense urban areas to 20 miles or more in rural environments.

The advanced forward link trilateration technology fixes the location of the mobile device 102 based on measurements taken of time and distance signals from nearby cell towers. The mobile device 102 reports the time and distance measurements to the network 112, then the network 112 triangulates a location fix of the mobile device 102, and reports the location fix back to mobile device 102. In general, more than three surrounding cell towers are required to triangulate an optimal location fix. Because of the time required to measure signals from multiple cell towers, to report the measurements to the network 112, to triangulate the location fix, and to report the location fix back to the mobile device 102, the advanced forward link trilateration technology requires significant amounts of both time and resources from the mobile device 102 and the network 112. Therefore, although the advanced forward link trilateration technology determines high accuracy location fixes, the mobile device 102 executes the advanced forward link trilateration technology in the background infrequently for periodic determinations of location fixes.

The mobile device 102 can use a hybrid technology to fix the location of the mobile device 102 based on a combination of other location fix technologies. For example, if the mobile device 102 is indoors, but close to a window, the global positioning system technology in combination with a cell tower location technology can calculate the location fix for the mobile device 102. When the mobile device 102 is indoors, the mobile device 102 may receive signals from an insufficient number of satellites to triangulate the position of the mobile device 102. However, the hybrid technology can combine the signals from the insufficient number of satellites with the cell tower location identified by the CLM to calculate a hybrid location fix for the mobile device 102.

Figure 2:
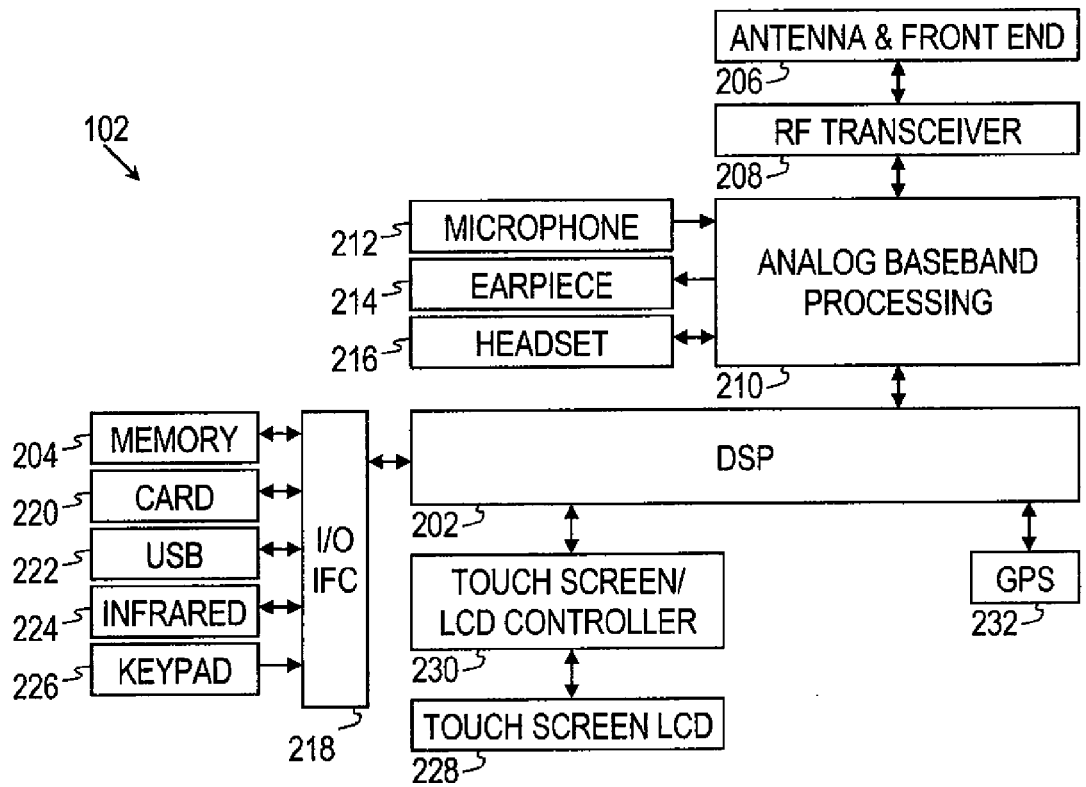
FIG. 2 shows a block diagram of an illustrative mobile device.

FIG. 2 shows a block diagram of the mobile device 102. The mobile device 102 includes a digital signal processor (DSP) 202 and a memory 204. As shown, the mobile device 102 may further include an antenna and front end unit 206, a radio frequency (RE) transceiver 208, an analog baseband processing unit 210, a microphone 212, an earpiece speaker 214, a headset port 216, an input/output interface 218, a memory card 220, a universal serial bus (USB) port 222, an infrared port 224, a keypad 226, a liquid crystal display (LCD) with a touch sensitive surface 228, a touch screen/LCD controller 230, and a global positioning system (GPS) sensor 232.

The DSP 202 or some other form of controller or central processing unit operates to control the various components of the mobile device 102 in accordance with embedded software or firmware stored in the memory 204. In addition to the embedded software or firmware, the DSP 202 may execute other applications stored in the memory 204 or made available via information carrier media such as portable data storage media like the memory card 220 or via wired or wireless network communications. The application software may comprise a compiled set of machine-readable instructions that configure the DSP 202 to provide the desired functionality, or the application software may be high-level software instructions to be processed by an interpreter or compiler to indirectly configure the DSP 202.

The antenna and front end unit 206 converts between wireless signals and electrical signals, enabling the mobile device 102 to send and receive information from a cellular network or some other available wireless communications network. The RF transceiver 208 provides frequency shifting, e.g., converting received RE signals to baseband and converting baseband transmit signals to RF. The received RF signals can be from one cell tower, such as the first cell tower 108, or from multiple cell towers, such as the first cell tower 108 and the second cell tower 110. The analog baseband processing unit 210 provides channel equalization and signal demodulation to extract information from received signals, modulates information to create transmit signals, and provides analog filtering for audio signals. To that end, the analog baseband processing unit 210 includes ports for connecting to the built-in microphone 212 and the earpiece speaker 214 that enable the mobile device 102 to be used as a cell phone.

The DSP 202 can send and receive digital communications with a wireless network via the analog baseband processing unit 210. The input/output interface 218 interconnects the DSP 202 and various memories and interfaces. The memory 204 and the removable memory card 220 may provide software and data to configure the operation of the DSP 202. The infrared port 224 and other optional ports such as a Bluetooth interface or an IEEE 802.11 compliant wireless interface enable the mobile device 102 to communicate wirelessly with other nearby mobile devices and/or wireless base stations. In some contemplated systems, the mobile device 102 is able to wirelessly exchange information at a point-of-sale when placed near a suitable transceiver.

The keypad 226 couples to the DSP 202 via the I/O interface 218 to provide one mechanism for the user to make selections, enter information, and otherwise provide input to the mobile device 102. Another input mechanism may be the touch screen display 228, which may also display text and/or graphics to the user. The display controller 230 couples the DSP 202 to the touch screen display 228.

The GPS sensor 232 is coupled to the DSP 202 to decode global positioning system signals, thereby providing at least one technology for the mobile device 102 to determine its location. Various other peripherals may also be included to provide additional functions, e.g., radio and television reception.

Figure 3:
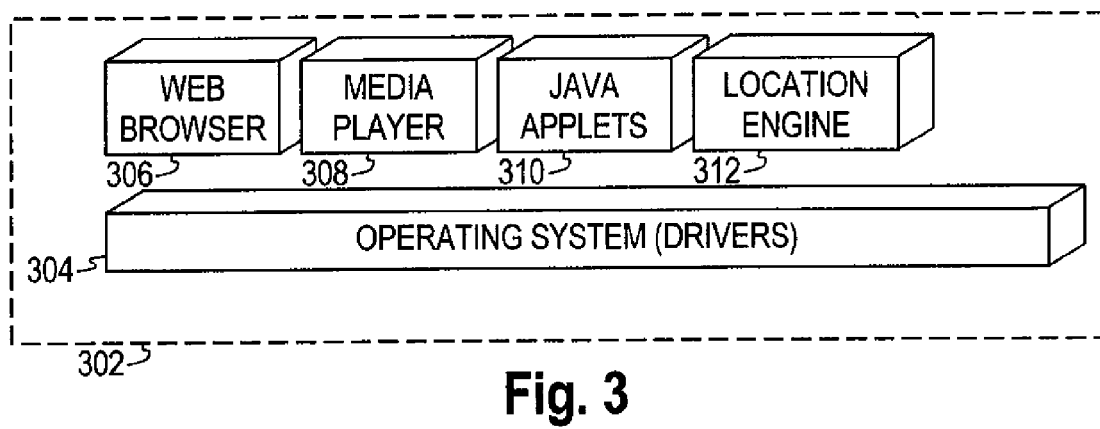
FIG. 3 shows a block diagram of an illustrative software configuration for a mobile device.

FIG. 3 illustrates a software environment 302 that may be implemented by the DSP 202. The DSP 202 executes operating system software 304 that provides a platform from which the rest of the software operates. The operating system software 304 provides drivers for the mobile device hardware to make standardized interfaces available to application software. The operating system software 304 may transfer control between applications running on the mobile device 102. Also shown in FIG. 3 are a web browser 306 application, a media player 308, application Java applets 310, and a location engine 312 application. The web browser 306 application configures the mobile device 102 to operate as a web browser, allowing the user to enter information into forms and select links to retrieve and view web pages, including content from the content server 112. The media player 308 application configures the mobile device to retrieve and play audio or audiovisual media on its own output components. The Java applets 310 may configure the mobile device 102 to provide games, utilities, and other functionality on the mobile device 102. These are further examples of content that may be provided by the content server 114.

The location engine 312 application can take a radio frequency fingerprint for the mobile device 102, and determine whether the radio frequency fingerprint matches another radio frequency fingerprint associated with a location fix. A radio frequency fingerprint is a set of wireless signals, such as cell tower signals and cell sector signals, received by the antenna and front end unit 206 from a wireless communication network and converted to baseband by the RF transceiver 208. The location engine 312 can also execute a location fix technology for the mobile device 102 in response to a determination that the radio frequency fingerprint does not match the other radio frequency fingerprint associated with the location fix.

FIG. 4 shows a block diagram of the location data 402 for location inference using radio frequency fingerprinting according to some embodiments of the present disclosure. The location data 402 includes a radio frequency fingerprints index 404 column, a radio frequency fingerprint data 406 column, a location fix 408 column, and a location fix time 410 column. The radio frequency fingerprints index 404 column includes an identifier for each radio frequency fingerprint, such as a current radio frequency fingerprint 412, a previous radio frequency fingerprint 414, and a historic radio frequency fingerprint 416.

For example, "cell tower #1844 sectors alpha and beta; cell tower #1863 sector beta" is listed in the current radio frequency fingerprint 412 row under the radio frequency fingerprint data 406 column. The data shown for the current radio frequency fingerprint 412 indicates that the antenna and front end unit 206 receives information from the first cell tower 108 and the second cell tower 110, which can be identified by cell tower identifiers, such as #1844 and #1863. Most cell towers broadcast using multiple cell sectors, typically three that are labeled alpha, beta, and gamma. Cell sectors are sub-regions of a coverage area for a cell tower, but because cell sectors change dynamically based on usage requirements, cell sectors do not necessarily identify specific geographical locations. Each cell sector signal can include multiple frequencies, such as 10 frequencies per cell sector region. The data for the current radio frequency fingerprint 412 can also indicate that the antenna and front end unit 206 receives information from the alpha sector and the beta sector for the first cell tower 108, but not from the gamma sector for the first cell tower 108, and information from the beta sector for the second cell tower 110, but not from the alpha sector or the gamma sector for the second cell tower 110.

The data for the current radio frequency fingerprint 412 can also include cell tower signal amplitude, cell tower signal phase, cell sector frequencies, and pseudo noise phase measurement data. The mobile device 102 detects the pseudo noise phase measurement data broadcast by radiating cell towers. Depending on variables such as processor power, available battery power, accuracy required, and the tolerance for false alarms, the location engine 312 can detect very small increments of movement by the mobile device 102 by tracking the phase shifts of the pseudo noise phase measurement data. Because no location fix has been recently executed, the location fix 408 column and the location fix time 410 column do not list a location fix or a location fix time for the current radio frequency fingerprint 412 row.

In row 414, "cell tower #1844 sector alpha; cell tower #1863 sector beta" is listed under the radio frequency fingerprint data 406 column. The data shown for the previous radio frequency fingerprint 414 indicates that the antenna and front end unit 206 received information from the alpha sector for the first cell tower 108, but not from the beta sector or the gamma sector for the first cell tower 108, and information from the beta sector for the second cell tower 110, but not from the alpha sector or the gamma sector for the second cell tower 110. The location fix 408 column lists "latitude 42 degrees 35 minutes north and longitude 83 degrees and 1 minute west" as a previous location fix in the previous radio frequency fingerprint 414 row. This previous location fix is associated with the previous radio frequency fingerprint 414 because the location fix technology that produced the previous location fix was executed at the time the previous radio frequency fingerprint 414 was taken. The location fix time 410 column lists "3:01:59 PM on Feb. 5, 2006" as a previous location fix time in the current radio frequency fingerprint 412 row. This previous location fix time is associated with the previous radio frequency fingerprint 414 because it indicates when the location fix technology that produced the previous location fix was executed at the time the previous radio frequency fingerprint 414 was taken.

In row 416, "cell tower #1844 sectors alpha and beta; cell tower #1863 sector beta" is listed under the radio frequency fingerprint data 406 column. The data shown for the historic radio frequency fingerprint 416 indicates that the antenna and front end unit 206 received information from the alpha sector and the beta sector for the first cell tower 108, but not from the gamma sector for the first cell tower 108, and information from the beta sector for the second cell tower 110, but not from alpha sector or the gamma sector for the second cell tower 110. The location fix 408 column lists "latitude 42 degrees 25 minutes north and longitude 83 degrees and 1 minute west" as a historic location fix in the historic radio frequency fingerprint 416 row. This historic location fix is associated with the historic radio frequency fingerprint 416 because the location fix technology that produced the historic location fix was executed at the time the historic radio frequency fingerprint 416 was taken. The location fix time 410 column lists "3:00:00 PM on Feb. 5, 2006" as a historic location fix time in the historic radio frequency fingerprint 416 row. This historic location fix is associated with the historic radio frequency fingerprint 416 because the location fix technology that produced the historic location fix was executed at the time the historic radio frequency fingerprint 416 was taken.

Although the location data 402 depicts only one entry for the previous radio frequency fingerprint 414 row and only one entry for the historic radio frequency fingerprint 416 row, the location data 402 can store multiple location fixes and multiple location fix times for each previous and historic radio frequency fingerprint.

Figure 5:
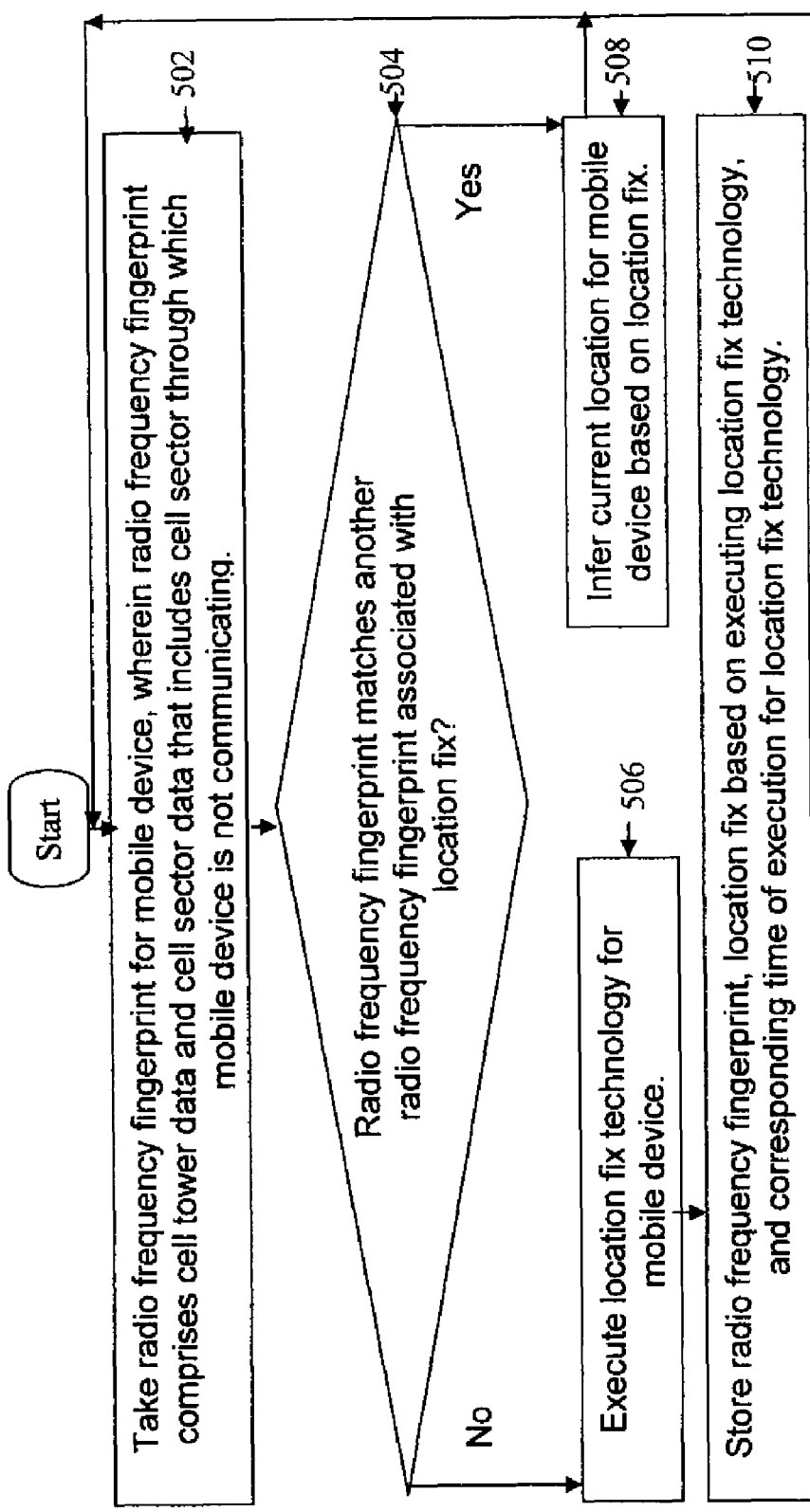
FIG. 5 shows a flowchart of a method for location inference using radio frequency fingerprinting according to some embodiments of the present disclosure.

FIG. 5 is a flowchart illustrating a method for location inference using radio frequency fingerprinting according to some embodiments of the present disclosure. The mobile device 102 can use the method to infer the location of the mobile device 102 and avoid unnecessary executions of location fix technologies to fix the location of the mobile device 102.

In box 502, the location engine 312 application takes a radio frequency fingerprint for the mobile device 102, wherein the radio frequency fingerprint comprises cell tower data and cell sector data that includes a cell sector through which the mobile device is not communicating. For example, "cell tower #1844 sectors alpha and beta; cell tower #1863 sector beta" listed in the current radio frequency fingerprint 412 row under the radio frequency fingerprint data 406 column is a radio frequency fingerprint that indicates that the mobile device is communicating through sector alpha of cell tower #1844, but not communicating through sector beta of cell tower #1844 or sector beta of cell tower #1863.

No additional consumption of time or resources is required for the mobile device 102 to take a radio frequency fingerprint because the mobile device already takes radio frequency fingerprints on a periodic basis to determine if the mobile device 102 will switch from communicating with one cell tower to communicating with another cell tower. Optionally, the location engine 312 can send the radio frequency fingerprint for the mobile device 102 to the location inference server 116. The location engine 312 application can take a radio frequency fingerprint for the mobile device 102, based on a duration of time, a use of the web browser 306 application on the mobile device 102, a call on the mobile device 102, a location request, and an enablement of a global positioning system.

The location engine 312 application can take a radio frequency fingerprint for the mobile device 102 based on a duration of time, such as on a per-minute basis. The location engine 312 application can take a radio frequency fingerprint for the mobile device 102 in the background without requiring significant time or resources for the mobile device 102 and the network 112. If the current radio frequency fingerprint does not indicate a significant change from a previous radio frequency fingerprint, then the location engine application 312 can wait for the same duration of time before taking another radio frequency fingerprint. However, if the current radio frequency fingerprint indicates a significant change from the previous radio frequency fingerprint, then the location engine application 312 can wait for a shorter duration of time before taking another radio frequency fingerprint. Similarly, if repeatedly the current radio frequency fingerprint does not indicate a significant change from the previous radio frequency fingerprint, then the location engine application 312 can wait for a longer duration of time before taking another radio frequency fingerprint.

A significant change from the previous radio frequency fingerprint can indicate that the mobile device 102 is in a different location from the location where the previous radio frequency fingerprint was taken. The absence of a significant change from the previous radio frequency fingerprint can indicate that the mobile device 102 is in the same location as the location where the previous radio frequency fingerprint was taken. A significant change from the previous radio frequency fingerprint can be due to differences in signals from the various cell towers in range of the mobile device 102 that rise above a specified threshold level, such that the differences indicate movement of the mobile device 102 that is likely to have a material bearing on the decision-making process of the content server 114 providing customized content. For example, if an advertisement provider does not want to send an advertisement to numerous mobile device users who are not attending a football game, a significant change from a previous radio frequency fingerprint taken at the football game can reflect the amount of movement that indicates a user of the mobile device 102 left the football game.

The location engine 312 application can take a radio frequency fingerprint for the mobile device 102 based on a use of the web browser 306 application on the mobile device 102. If the user of the mobile device 102 activates the web browser 306 application, the most recent radio frequency fingerprint may not have been taken recently. Because taking a radio frequency fingerprint does not require significant time or resources for the mobile device 102 and the network 112, any request for content currently made through the activation of the web browser 306 application can use the currently taken radio frequency fingerprint instead of the previous radio frequency fingerprint.

The location engine 312 application can take a radio frequency fingerprint for the mobile device 102 based on a call on the mobile device 102. If the user makes a call on the mobile device 102, the most recent radio frequency fingerprint may not have been taken recently. Because taking a radio frequency fingerprint does not require significant time or resources for the mobile device 102 and the network 112, any request for content currently made through the call made on the mobile device 102 can use the currently taken radio frequency fingerprint instead of the previous radio frequency fingerprint.

The location engine 312 application can take a radio frequency fingerprint for the mobile device 102 based on a location request from the location inference server 116, such as when an advertisement provider is prepared to transmit an advertisement designed for mobile devices that are located in a football stadium where a football game is being played. The most recent radio frequency fingerprint may not have been taken recently for many of the mobile devices located in the football stadium during the football game. The location inference server 116 can transmit a location request that specifies a cell tower proximity and a time required for responding with the location, which limits the time for determining whether the current radio frequency fingerprint matches a previous radio frequency fingerprint. For example, the location inference server 116 can transmit a location request to all of the mobile devices that are communicating through the cell tower #1844, the cell tower closest to the football stadium, or all of the cell towers on wheels that are present at the football game. All of the mobile devices communicating through the cell tower #1844 may begin to take a radio frequency fingerprint in the background. The location inference server 116 can also specify the time required for a location fix update. If the mobile device 102 cannot determine whether the current radio frequency fingerprint matches a previous radio frequency fingerprint in the background within the time specified for the location update, such as 1 second, the location request can be terminated.

The location engine 312 application can take a radio frequency fingerprint for the mobile device 102 based an enablement of the global positioning system, such as when the mobile device 102 is taken from indoors to outdoors. The mobile device 102 can periodically check for global positioning system enablement based on the passage of time.

In box 504, the location engine 312 determines whether the radio frequency fingerprint matches another radio frequency fingerprint associated with a location fix. For example, the location engine 312 determines that the current radio frequency fingerprint matches a previous radio frequency fingerprint associated with a location fix if a degree of confidence score based on a comparison of the current radio frequency fingerprint and the previous radio frequency fingerprint exceeds a specified threshold score.

The location engine 312 uses a degree of confidence score to determine matches because the signal strength from cell towers is highly variable due to the amount of communication traffic and the time of the day, such that the mobile device 102 can take slightly different radio frequency fingerprints over time even when the mobile device 102 is completely stationary. The cell tower closest to the mobile device 102 may become very busy, and contract the cell tower signal strength accordingly. The radio frequency fingerprint for the mobile device 102 can include signals from a primary cell tower, which can indicate the longitude and the latitude of the primary cell tower, and signals from additional cell towers. Furthermore, the radio frequency fingerprint can include multiple frequencies for each sector for each cell tower that is within range of the mobile device 102. Therefore, the location engine 312 executes an algorithm to produce a confidence score based on the likelihood that the current radio frequency fingerprint is taken from the same location as another radio frequency fingerprint that is associated with a location fix. For example, if the current radio frequency fingerprint included signals from four cell towers, and a previous radio frequency fingerprint included signals from the same four cell towers and one additional cell tower, the algorithm can set the degree of confidence at 90%. If the location engine 312 compares the 90% degree of confidence to a specified threshold score of 80%, the location engine 312 can determine that the current radio frequency fingerprint matches the previous radio frequency fingerprint.

The specified threshold score can be set variably, and can be based on a significant difference between the current radio frequency fingerprint and another radio frequency fingerprint. The significant differences in radio frequency fingerprints can also be used as the basis for monitoring employees during working hours using their mobile phones or tracking prisoners with a mobile device that is used as a tracking device.

Alternatively, the location inference server 116 determines whether the radio frequency fingerprint matches another radio frequency fingerprint associated with a location fix for another mobile device. Instead of comparing the radio frequency fingerprint for the mobile device 102 to a radio frequency fingerprint previously taken for the same mobile device 102, the location inference server 116 can compare the current radio frequency fingerprint for the mobile device 102 to a current radio frequency fingerprint taken for another mobile device. For example, the mobile device 102 is a mobile phone and the other mobile device is an automobile-based mobile device that is communicating with the mobile phone through a Bluetooth interface. The location inference server 116 compares the current radio frequency fingerprint for the mobile phone with the current radio frequency fingerprint associated with a location fix for the automobile-based mobile device. If the radio frequency fingerprints match, the location inference server 116 can instruct the mobile phone to obtain the location fix from the automobile-based mobile device through ongoing communications without consuming significant time and resources for the mobile phone and the mobile phone network by executing a location fix technology. Similarly, mobile devices in communication with other mobile devices as part of a social network can obtain a location fix from one of the mobile devices if the location inference server 116 determines that they share the same radio frequency fingerprint as the mobile device currently associated with the location fix.

As yet another alternative, the location inference server 116 can instruct one mobile device to provide a location fix and a radio frequency fingerprint, and infer that other mobile devices that share the provided radio frequency fingerprint are also located at the same location fix. The location inference server 116 can instruct the mobile device 102 to execute a location fix technology and provide the resulting location fix along with the radio frequency fingerprint for the mobile device 102 to the location inference server 116. The location inference server 116 can instruct other mobile devices that are communicating via the primary cell tower identified in the radio frequency fingerprint for the mobile device 102 to provide their radio frequency fingerprints. The location inference server 116 determines whether any of the other radio frequency fingerprints match the radio frequency fingerprint for the mobile device 102 that is associated with the location fix for the mobile device 102. If any of the other radio frequency fingerprints match the same radio frequency fingerprint as the mobile device 102 currently associated with the location fix, the location inference server 116 can infer that any mobile device that provided the matching radio frequency fingerprint is located at the location fix determined by the mobile device 102.

Furthermore, the location inference server 116 can instruct a specified percentage of the other mobile devices that are communicating via the primary cell tower identified in the radio frequency fingerprint for the mobile device 102 to execute a location fix technology and provide the resulting location fixes along with the radio frequency fingerprints for the other mobile devices to the location inference server 116. The location inference server can use the resulting location fixes and the radio frequency fingerprints for the other mobile devices to infer locations for additional mobile devices that have radio frequency fingerprints that match any of the provided radio frequency fingerprints.

If the location engine 312 determines that the radio frequency fingerprint does not match any radio frequency fingerprint associated with its location fix, the method continues to box 506. If the location engine 312 determines that the radio frequency fingerprint matches any radio frequency fingerprint associated with its location fix, the method proceeds to box 508.

In box 506, the location engine 312 executes a location fix technology for the mobile device 102. For example, the location engine 312 executes a global positioning system location fix technology for the mobile device 102. In other examples, the location engine can execute an advanced forward link trilateration technology or a hybrid location fix technology for the mobile device 102. Then the method proceeds to box 510.

In box 508, the location engine 312 infers a current location for the mobile device 102 based on a location fix. Although a radio frequency fingerprint cannot independently fix a location for the mobile device 102, the radio frequency fingerprint can fix the location of the mobile device 102 when used with an associated location fix technology executed at the same time that the radio frequency fingerprint was taken. For example, the location engine 312 infers that the current location for the mobile device 102 is the same as a historic location of the mobile device 102 because the current radio frequency fingerprint 412 matches the historic radio frequency fingerprint 416. The historic radio frequency fingerprint 416 was taken when the executed location fix technology fixed the location of the mobile device 102 as "latitude 42 degrees 25 minutes north and longitude 83 degrees and 1 minute west." Without consuming the significant time and resources for the mobile device 102 and the network 112 to execute a location fix technology, the location engine 312 infers the current location to be "latitude 42 degrees 25 minutes north and longitude 83 degrees and 1 minute west." Then the method returns to box 502 to take a new radio frequency fingerprint for the mobile device 102.

In box 510, the location engine 312 stores the radio frequency fingerprint, the location fix based on executing the location fix technology, and the corresponding time of execution for the location fix technology. For example, the location engine 312 previously stored the data listed in the radio frequency fingerprint data 406 column, the location fix 408 column, and the location fix time 410 column for the previous radio frequency fingerprint 414 row. The location engine 312 can store such information either in the mobile device 102, in the location inference server 116, or any combination thereof. In addition to storing this information for the previous radio frequency fingerprint 414, the location engine 312 can store this information for any additional previous radio frequency fingerprints, such as the historic radio frequency fingerprint 416. The location engine 312 can compare the current radio frequency fingerprint with each stored radio frequency fingerprint for matching purposes. The amount of information that can be stored for historic radio frequency fingerprints can depend upon the memory available for the mobile device 102 and the location inference server 116. Then the method returns to box 502 to take a new radio frequency fingerprint for the mobile device 102.

Parts of the system described above may be implemented on any general-purpose server with sufficient processing power, memory resources, and network throughput capability to handle the necessary workload placed upon it. FIG. 6 can illustrates either the content server 114 and/or the location inference server 116, which are suitable for implementing one or more embodiments disclosed herein. The content server 114 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor 682 may be implemented as one or more CPU chips.

The secondary storage 684 is typically comprised of one or more disk drives or tape drives and is used for non-volatile storage of data and as an over-flow data storage device if the RAM 688 is not large enough to hold all working data. The secondary storage 684 may be used to store programs that are loaded into the RAM 688 when such programs are selected for execution. The ROM 686 is used to store instructions and perhaps data that are read during program execution. The ROM 686 is a non-volatile memory device that typically has a small memory capacity relative to the larger memory capacity of secondary storage. The RAM 688 is used to store volatile data and perhaps to store instructions. Access to both the ROM 686 and the RAM 688 is typically faster than to secondary storage 684.

The I/O 690 devices may include printers, video monitors, liquid crystal displays (LCDs), touch screen displays, keyboards, keypads; switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier Wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts that it accesses from hard disk, floppy disk, optical disk (these various disk based systems may all be considered the secondary storage 684), the ROM 686, the RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for inferring location of a mobile device, comprising:
    taking a radio frequency fingerprint of a mobile device, wherein the radio frequency fingerprint comprises cell tower data and cell sector data that includes a cell sector through which the mobile device is not communicating;
    prior to executing a location fix technology, determining whether the radio frequency fingerprint matches a previous radio frequency fingerprint of a second mobile device associated with a location fix; and
    executing the location fix technology for the mobile device in response to a determination that the radio frequency fingerprint does not match the previous radio frequency fingerprint, wherein the location fix technology is selected from the group consisting of advanced forward link trilateration, global positioning system, and a hybrid location fix technology.

2. The method of claim 1, further comprising: inferring a current location for the mobile device based on the location fix in response to a determination that the radio frequency fingerprint matches the previous radio frequency fingerprint.

3. The method of claim 1 further comprising storing the radio frequency fingerprint, a location fix based on executing the location fix technology, and a corresponding time of execution for the location fix technology.

4. The method of claim 3 wherein storing the radio frequency fingerprint, the location fix based on executing the location fix technology, and the corresponding time comprises maintaining a history of the radio frequency fingerprint, the location fix, and the corresponding time.

5. The method of claim 1 wherein the location request specifies a cell tower proximity and a time required for determining whether the radio frequency fingerprint matches the previous radio frequency fingerprint.

6. The method of claim 1, wherein the radio frequency fingerprint further comprises at least one of cell tower signal amplitude, cell tower signal phase, cell sector frequencies, and pseudo noise phase measurement data.

7. The method of claim 1, wherein the radio frequency fingerprint matches the previous radio frequency fingerprint if a degree of confidence score based on a comparison of the radio frequency fingerprint and the previous radio frequency fingerprint exceeds a specified threshold score.

8. A system for inferring location of a mobile device, comprising:
    a mobile device; and
    a location engine on the mobile device to take a radio frequency fingerprint of the mobile device, wherein the radio frequency fingerprint includes cell tower data and cell sector data that includes a cell sector through which the mobile device is not communicating; to determine whether the radio frequency fingerprint matches a previous radio frequency fingerprint of a second mobile device associated with a location fix prior to executing a location fix technology; and to execute the location fix technology for the mobile device in response to a determination that the radio frequency fingerprint does not match the previous radio frequency fingerprint associated with the location fix, wherein the location fix technology is selected from the group consisting of advanced forward link trilateration, global positioning system, and a hybrid location fix technology.

9. The system of claim 8, wherein the location engine is further operable to infer a current location for the mobile device based on the location fix in response to a determination that the radio frequency fingerprint matches the previous radio frequency fingerprint.

10. The system of claim 8 wherein the location engine is further operable to store the radio frequency fingerprint, a location fix based on executing the location fix technology, and a corresponding time of execution for the location fix technology on the mobile device.

11. The system of claim 10, further comprising a server in communication with the mobile device, wherein the location engine is further operable to store the radio frequency fingerprint, the location fix based on executing the location fix technology, and the corresponding time of execution for the location fix technology on the server.

12. The system of claim 10 wherein the location engine is further operable to maintain a history of the radio frequency fingerprint, the location fix based on executing the location fix technology, and the corresponding time.

13. The system of claim 8 wherein the location engine takes the radio frequency fingerprint based on one of a duration of time, a use of a browser on the mobile device, a call on the mobile device, a location request, and an enablement of a global positioning system.

14. A method for inferring location of a mobile device, comprising:
    taking a radio frequency fingerprint of a mobile device, wherein the radio frequency fingerprint includes cell tower data and cell sector data that includes a cell sector through which the mobile device is not communicating;
    prior to executing a location fix technology, determining whether the radio frequency fingerprint matches an other radio frequency fingerprint of an other mobile device associated with a location fix for the other mobile device; and
    executing the location fix technology for the mobile device in response to a determination that the radio frequency fingerprint does not match the other radio frequency fingerprint, wherein the location fix technology is selected from the group consisting of advanced forward link trilateration, global positioning system, and a hybrid location fix technology.

15. The method of claim 14, further comprising: inferring a current location for the mobile device based on the location fix in response to a determination that the radio frequency fingerprint matches the other radio frequency fingerprint.

16. The method of claim 14 further comprising storing the radio frequency fingerprint, a location fix based on executing the location fix technology, and a corresponding time of execution for the location fix technology.

17. The method of claim 16 wherein storing the radio frequency fingerprint, the location fix based on executing the location fix technology, and the corresponding time comprises maintaining a history of the radio frequency fingerprint, the location fix based on executing the location fix technology, and the corresponding time.

18. The method of claim 14 further comprising taking the radio frequency fingerprint based on one of a duration of time, a use of a browser on the mobile device, a call on the mobile device, a location request, and an enablement of a global positioning system.

19. The method of claim 1, wherein the second mobile device is the mobile device.

* * * * *